(12) United States Patent
Tsuruta et al.

(10) Patent No.: US 9,914,835 B2
(45) Date of Patent: Mar. 13, 2018

(54) CARBON BLACK, METHOD FOR PRODUCING CARBON BLACK, AND RUBBER COMPOSITION

(71) Applicant: TOKAI CARBON CO., LTD., Tokyo (JP)

(72) Inventors: Masashi Tsuruta, Tokyo (JP); Takeshi Akahane, Tokyo (JP); Hiroki Uchiyama, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 0 days.

(21) Appl. No.: 14/906,324

(22) PCT Filed: Jul. 24, 2013

(86) PCT No.: PCT/JP2013/070020
§ 371 (c)(1),
(2) Date: Jan. 20, 2016

(87) PCT Pub. No.: WO2015/011796
PCT Pub. Date: Jan. 29, 2015

(65) Prior Publication Data
US 2016/0177102 A1 Jun. 23, 2016

(51) Int. Cl.
*C09C 1/48* (2006.01)
*C08K 3/04* (2006.01)
(Continued)

(52) U.S. Cl.
CPC ............... *C09C 1/48* (2013.01); *B01J 8/1836* (2013.01); *B01J 8/24* (2013.01); *B60C 1/0016* (2013.01);
(Continued)

(58) Field of Classification Search
None
See application file for complete search history.

(56) References Cited

U.S. PATENT DOCUMENTS

| 5,877,250 A | 3/1999 | Sant |
| 2009/0208751 A1 | 8/2009 | Green et al. |

FOREIGN PATENT DOCUMENTS

| JP | 59-184231 A | 10/1984 |
| JP | 59184231 A * | 10/1984 |

(Continued)

OTHER PUBLICATIONS

International Search Report dated Oct. 22, 2013, issued in counterpart application No. PCT/JP2013/070020 (2 pages).

*Primary Examiner* — Richard A Huhn
(74) *Attorney, Agent, or Firm* — Westerman, Hattori, Daniels & Adrian, LLP

(57) ABSTRACT

Carbon black is used as a component of a rubber composition, ensures that the resulting rubber exhibits improved processability, is reinforced in an improved manner, and exhibits low heat buildup, and may suitably be used for a rubber member (e.g., tire tread) and the like for which high abrasion resistance is required. The carbon black includes primary particles having an average particle size of 15 to 35 nm, and forms aggregates having a Stokes mode diameter measured using a centrifugal sedimentation method of 140 to 180 nm, and having a spherical shape when observed using a transmission electron microscope.

4 Claims, 2 Drawing Sheets

(51) Int. Cl.
    *B60C 1/00*        (2006.01)
    *B01J 8/18*         (2006.01)
    *B01J 8/24*         (2006.01)

(52) U.S. Cl.
    CPC ....... C08K 3/04 (2013.01); *B01J 2208/00203* (2013.01); *C01P 2004/04* (2013.01); *C01P 2004/64* (2013.01); *C01P 2006/12* (2013.01); *C01P 2006/19* (2013.01); *C08K 2201/003* (2013.01)

(56) References Cited

FOREIGN PATENT DOCUMENTS

| | | | |
|---|---:|---|---|
| JP | 3-137167 | A | 6/1991 |
| JP | 5-295176 | A | 11/1993 |
| JP | 6-136288 | A | 5/1994 |
| JP | 8-169983 | A | 7/1996 |
| JP | 11-503486 | A | 3/1999 |
| JP | 2002-188022 | A | 7/2002 |
| JP | 2008-56781 | A | 3/2008 |
| JP | 2011-37995 | A | 2/2011 |
| JP | 2011-515507 | A | 5/2011 |
| JP | 2012-158627 | A | 8/2012 |
| JP | 2012-158699 | A | 8/2012 |

\* cited by examiner

[Fig. 1]
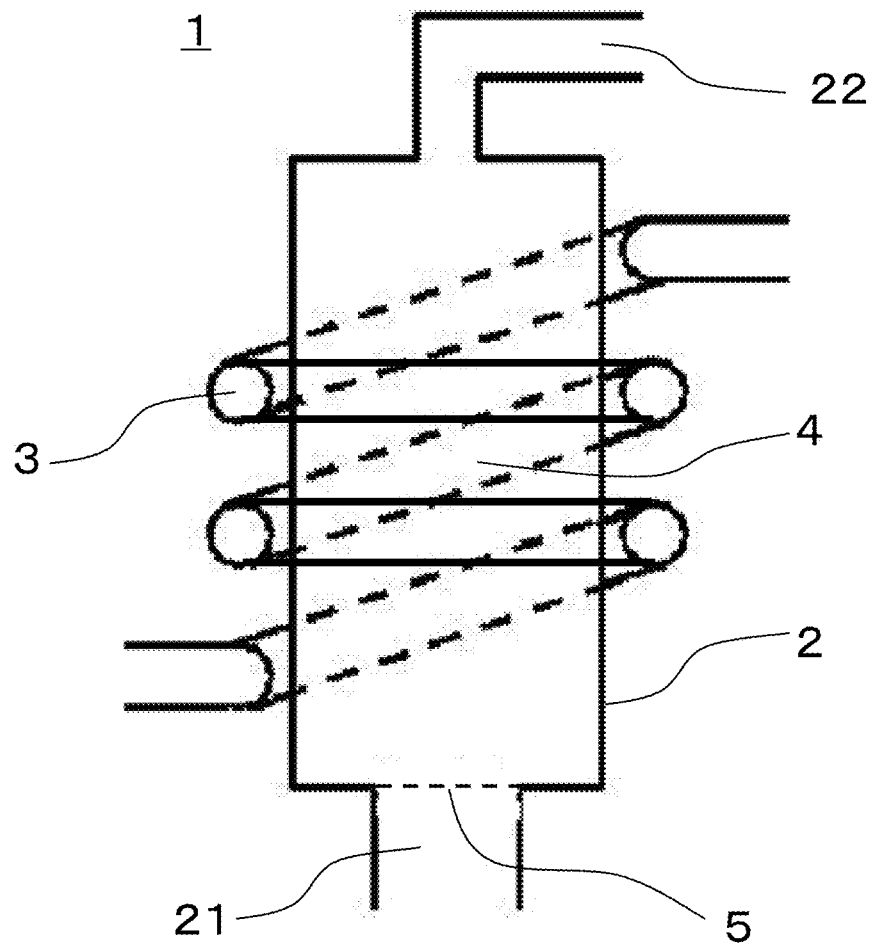
[Fig. 2]
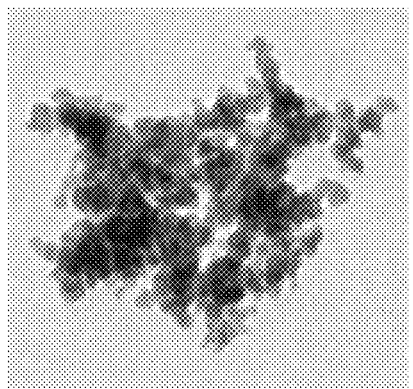

[Fig 3]
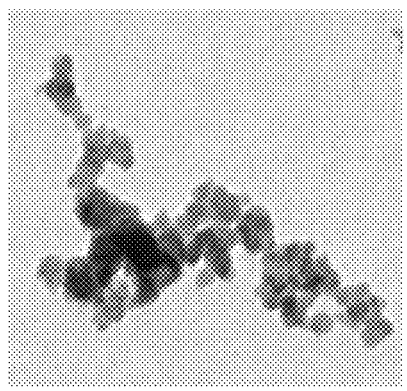

CARBON BLACK, METHOD FOR PRODUCING CARBON BLACK, AND RUBBER COMPOSITION

TECHNICAL FIELD

The present invention relates to carbon black, a method for producing carbon black, and a rubber composition.

BACKGROUND ART

Various types of carbon black that differ in properties are used for rubber reinforcement applications. Since the properties of the carbon black are major factors that determine the performance of the resulting rubber, carbon black having properties suitable for the target application is selected and added to a rubber composition.

For example, high-structure hard carbon black having a small primary particle size and a large specific surface area (e.g., SAF (N110) or ISAF (N220)) is used for a rubber member (e.g., tire tread) for which high abrasion resistance is required. However, a rubber obtained using a rubber composition that includes high-structure hard carbon black is highly reinforced, but tends to exhibit high heat buildup.

In recent years, development of fuel-efficient tires has been increasingly desired in order to address a social need for saving resources and energy, and a rubber composition that achieves low heat buildup suitable for fuel-efficient tires has been extensively developed. Low heat buildup is normally achieved by adding carbon black having a large particle size (i.e., equivalent diameter of secondary particles formed by aggregation and fusion of primary particles) and a small specific surface area to a rubber composition.

A rubber that is highly reinforced and exhibits low beat buildup is required to produce the tread of fuel-efficient tires. However, since carbon black that is used to improve the degree of reinforcement and carbon black that is used to improve heat buildup completely differ in particle size and specific surface area (i.e., have a trade-off relationship), it is difficult to obtain the desired rubber composition by adjusting the particle size and the specific surface area of the carbon black.

In order to deal with the above problem, technology has been proposed that improves rubber properties (e.g., degree of reinforcement and heat buildup) by microscopically evaluating the colloidal properties of carbon black in addition to the particle size, the specific surface area, the structure, and the like (that have been regarded as important as the basic properties of carbon black used for rubber reinforcement applications), and adding carbon black that has specific properties to a rubber component (see Patent Literature 1 (JP-A-2002-188022), for example).

CITATION LIST

Patent Literature

Patent Literature 1: JP-A-2002-188022

SUMMARY OF INVENTION

Technical Problem

In view of the above situation, an object of the invention is to provide novel carbon black that can improve rubber properties (e.g., degree of reinforcement and heat buildup), a method that can easily produce the carbon black, and a rubber composition that can improve rubber properties (e.g., degree of reinforcement, heat buildup, and processability).

Solution to Problem

The inventors of the invention conducted extensive studies in order to solve the above technical problem. As a result, the inventors found that the above technical problem can be solved by carbon black that includes primary particles having an average particle size of 15 to 35 nm, the carbon black forming aggregates having a Stokes mode diameter measured using a centrifugal sedimentation method of 140 to 180 nm, and having a spherical shape when observed using a transmission electron microscope. This finding has led to the completion of the invention.

Several aspects of the invention provide the following.
(1) Carbon black including primary particles having an average particle size of 15 to nm, the carbon black forming aggregates having a Stokes mode diameter measured using a centrifugal sedimentation method of 140 to 180 nm, and having a spherical shape when observed using a transmission electron microscope.
(2) The carbon black according to (1), the carbon black having a DBP absorption of 120 to 160 ml/100 g and a specific surface area by nitrogen adsorption of 70 to 120 $m^2/g$.
(3) A method for producing the carbon black according to (1) that produces the carbon black using a fluidized-bed reactor, the method including feeding a hydrocarbon gas to the fluidized-bed reactor to produce a gas stream, and stirring and fluidizing raw material carbon black using the gas stream with heating, the raw material carbon black being introduced into the fluidized-bed reactor separately from the hydrocarbon gas, and including primary particles having an average particle size of 15 to 35 nm, the raw material carbon black forming aggregates having a Stokes mode diameter measured using a centrifugal sedimentation method of 50 to 115 nm.
(4) A rubber composition including 100 parts by mass of a rubber component, and 20 to 100 parts by mass of the carbon black according to (1) or (2), or the carbon black obtained using the method according to (3).

Advantageous Effects of Invention

The invention thus provides carbon black that ensures that a rubber obtained using a rubber composition that includes the carbon black is reinforced in an improved manner, and exhibits low heat buildup.

The invention thus also provides a method that can easily produce the carbon black.

The invention thus further provides a rubber composition that improves rubber properties (e.g., degree of reinforcement, heat buildup, and processability).

BRIEF DESCRIPTION OF DRAWINGS

FIG. 1 is a schematic cross-sectional view illustrating a reactor that is used to produce carbon black according to one embodiment of the invention.

FIG. 2 is a view illustrating a transmission electron micrograph of an aggregate of the carbon black obtained in Example 1.

FIG. 3 is a view illustrating a transmission electron micrograph of an aggregate of the raw material carbon black used in Example 1.

DESCRIPTION OF EMBODIMENTS

Carbon black according to one embodiment of the invention is described below.

The carbon black according to one embodiment of the invention includes primary particles having an average particle size of 15 to 35 nm, the carbon black forming aggregates having a Stokes mode diameter measured using a centrifugal sedimentation method of 140 to 180 nm, and having a spherical shape when observed using a transmission electron microscope.

The carbon black according to one embodiment of the invention includes the primary particles.

Carbon black normally forms secondary particles that have a complex structure in which primary particles (i.e., spherical carbon primary particles) aggregate and branch in an irregular chain-like manner. The minimum unit of the aggregate structure is referred to as "aggregate".

The average particle size of the primary particles of the carbon black according to one embodiment of the invention is 15 to 35 nm, preferably 17 to 35 nm, more preferably 17 to 32 nm, further more preferably 17 to 30 nm, even more preferably 20 to 32 nm, still more preferably 20 to 30 nm, and yet more preferably 20 to 25 nm.

When the average particle size of the primary particles of the carbon black according to one embodiment of the invention is 15 to 35 nm, a rubber that exhibits low heat buildup and high resilience can be easily obtained using a rubber composition that includes the carbon black. If the average particle size of the primary particles is less than 15 nm (i.e., the primary particles of the carbon black are too small), a rubber obtained using a rubber composition that includes the carbon black may exhibit high heat buildup. If the average particle size of the primary particles exceeds 35 nm, a rubber obtained using a rubber composition that includes the carbon black may not be sufficiently reinforced.

Note that the term "average particle size" used herein in connection with the primary particles of the carbon black refers to the average value of the particle sizes of one thousand primary particles measured using a transmission electron microscope.

The Stokes mode diameter of the aggregates of the carbon black according to one embodiment of the invention measured using a centrifugal sedimentation method is 140 to 180 nm, preferably 145 to 180 nm, more preferably 145 to 177 nm, further more preferably 150 to 175 nm, and still more preferably 150 to 170 nm.

When the Stokes mode diameter of the aggregates is 140 to 180 nm, a rubber that is reinforced in an improved manner (since a larger amount of component can be efficiently trapped) and exhibits low heat buildup and high resilience can be easily obtained using a rubber composition that includes the carbon black.

If the Stokes mode diameter of the aggregates is less than 140 nm, a rubber obtained using a rubber composition that includes the carbon black may exhibit high heat buildup. If the Stokes mode diameter of the aggregates exceeds 180 nm, a rubber obtained using a rubber composition that includes the carbon black may not be sufficiently reinforced.

The term "Stokes mode diameter" used herein in connection with the aggregates of the carbon black refers to a value measured using a centrifugal sedimentation method. More specifically, the term "Stokes mode diameter" used herein in connection with the aggregates of the carbon black refers to a value calculated using the following method.

Specifically, a carbon black sample that has been dried in accordance with JIS K 6221 (1982) 5 ("Preparation of dried sample") is mixed with a 20 vol % ethanol aqueous solution including a small amount of surfactant to prepare a dispersion having a carbon black concentration of 50 mg/l. The carbon black is sufficiently dispersed using ultrasonic waves to prepare a carbon black dispersion (measurement sample).

After setting the rotational speed of a centrifugal sedimentation particle size distribution analyzer (disk centrifuge manufactured by Joyes Lobel (UK)) to 8,000 rpm, 10 ml of a spin solution (2 wt % glycerol aqueous solution, 25° C.) is introduced into the analyzer, and 1 ml of a buffer solution (20 vol % ethanol aqueous solution, 25° C.) is injected into the analyzer.

After the addition of 0.5 ml of the carbon black dispersion (25° C.) using a syringe, the mixture is subjected to centrifugal sedimentation while operating a recorder to draw a distribution curve in which the horizontal axis indicates the elapsed time (sec) from the addition of the carbon black dispersion using the syringe, and the vertical axis indicates the absorbance at the measurement point that changed due to the centrifugal sedimentation of the carbon black. The time T (sec) is read from the distribution curve, and substituted into the following expression (Expression 1) to calculate the Stokes equivalent diameter Dst (nm) that corresponds to each time T (sec).

$$Dst(\text{nm}) = \sqrt{\frac{3.7794 \times 10^9 \cdot \eta}{N^2 (\rho_{cs} - \rho_1)} \log \frac{r_s}{r_1}} \times \sqrt{\frac{1}{T}} \times 1000$$

where, η is the viscosity (0.935 cp) of the spin solution, N is the disk rotational speed (8,000 rpm), $r_1$ is the radius (4.56 cm) at the carbon black dispersion injection point, $r_2$ is the radius (4.82 cm) up to the absorbance measurement point, pcs is the density (g/cm$^3$) of the carbon black, and pi is the density (1.00178 g/cm$^3$) of the spin solution.

The greatest-frequency Stokes equivalent diameter in the distribution curve that represents the relationship between the Stokes equivalent diameter and the absorbance is determined to be the Stokes mode diameter (Dst (nm)).

The aggregates of the carbon black according to one embodiment of the invention have a spherical shape when observed using a transmission electron microscope.

The aggregates of carbon black formed by the aggregation of the primary particles normally have a linear shape (dendritic shape) (see FIG. 3) when observed using a transmission electron microscope. As illustrated in FIG. 4, the carbon black according to one embodiment of the invention forms spherical aggregates due to further aggregation of the primary particles.

The term "spherical" used herein in connection with the aggregates means that the ratio (minimum length/maximum length) of the minimum length to the maximum length is 0.6 to 1 when a carbon black sample is dispersed in chloroform, and the dispersion is placed on a carbon-reinforced support film, and observed using a transmission electron microscope at a magnification of 5,000 to measure the minimum length and the maximum length of each aggregate.

Note that the carbon black according to one embodiment of the invention may include spherical aggregates and linear (dendritic) aggregates. It is determined that the aggregates of the carbon black are spherical when the ratio (minimum length/maximum length) of the minimum length to the maximum length of 60 to 100% of one thousand aggregates is 0.6 to 1 when the minimum length and the maximum length of each aggregate are measured as described above.

The aggregates of carbon black normally have a complex structure in which the primary particles aggregate and branch in an irregular chain-like manner, and normally have an irregular dendritic shape (see above). It is considered that the aggregates of the carbon black according to one embodiment of the invention form a spherical structure having an increased Stokes mode diameter while maintaining the particle size of the primary particles through the fusion and the aggregation of the aggregates of the raw material carbon black having a dendritic shape, and an improvement in processability can be achieved when the carbon black according to one embodiment of the invention is added to a rubber composition (see below).

When the carbon black according to one embodiment of the invention that forms spherical aggregates having a large Stokes mode diameter is added to a rubber composition, it is considered that the resulting rubber exhibits low heat buildup since the average particle size of the primary particles is 15 to 35 nm, and is reinforced and exhibits low heat buildup since the Stokes mode diameter of the aggregates (secondary particles) (formed by the fusion and the aggregation of the aggregates of the raw material carbon black) is 140 to 180 nm.

The DBP absorption of the carbon black according to one embodiment of the invention is preferably 120 to 160 ml/100 g, more preferably 125 to 160 ml/100 g. further more preferably 125 to 155 ml/100 g, even more preferably 130 to 155 ml/100 g, and still more preferably 130 to 150 ml/100 g.

The DBP absorption of the carbon black is an index that represents the degree of structure (i.e., the degree of complexity of the aggregate structure) of the carbon black.

If the DBP absorption of the carbon black is less than 120 ml/100 g, a rubber obtained using a rubber composition that includes the carbon black may not be sufficiently reinforced due to deterioration in the dispersibility of the carbon black. If the DBP absorption of the carbon black exceeds 160 ml/100 g, the processability of a rubber obtained using a rubber composition that includes the carbon black may deteriorate.

Note that the term "DBP absorption" used herein refers to a value measured in accordance with JIS K 6217-4 ("Carbon black for rubber industry—Fundamental characteristics—Part 4: Determination of DBP absorption").

The specific surface area by nitrogen adsorption of the carbon black according to one embodiment of the invention is preferably 70 to 120 $m^2/g$, more preferably 75 to 120 $m^2/g$, further more preferably 75 to 115 nm/g, even more preferably 80 to 115 $m^2/ng$, and still more preferably 80 to 110 $m^2/g$.

The specific surface area by nitrogen adsorption of the carbon black is an index for determining the size of the primary particles of the carbon black.

If the specific surface area by nitrogen adsorption of the carbon black is less than 70 $m^2/g$, a rubber obtained using a rubber composition that includes the carbon black may not be sufficiently reinforced. If the specific surface area by nitrogen adsorption of the carbon black exceeds 120 $m^2/g$, a rubber obtained using a rubber composition that includes the carbon black may exhibit high heat buildup.

Note that the term "specific surface area by nitrogen adsorption" used herein refers to a value measured in accordance with JIS K 6217-2 ("Carbon black for rubber industry—Fundamental characteristics—Part 2: Determination of specific surface area—Nitrogen adsorption methods—Single-point procedures").

When the carbon black according to one embodiment of the invention is used as a component of a rubber composition, the resulting rubber is reinforced in an improved manner, and exhibits low heat buildup and improved impact resilience. The carbon black according to one embodiment of the invention may suitably be used as a component of a tire tread rubber composition.

The carbon black according to one embodiment of the invention may be produced using a method for producing carbon black according to one embodiment of the invention (that is described in detail below).

The method for producing carbon black according to one embodiment of the invention is described below.

The method for producing carbon black according to one embodiment of the invention produces carbon black using a fluidized-bed reactor, the method including feeding a hydrocarbon gas to the fluidized-bed reactor to produce a gas stream, and stirring and fluidizing raw material carbon black using the gas stream with heating, the raw material carbon black being separately introduced into the fluidized-bed reactor, and including primary particles having an average particle size of 15 to 35 nm, the raw material carbon black forming aggregates having a Stokes mode diameter measured using a centrifugal sedimentation method of 50 to 115 nm.

The hydrocarbon gas that is fed to the fluidized-bed reactor when implementing the method for producing carbon black according to one embodiment of the invention may be one or more hydrocarbon gases selected from an aromatic hydrocarbon gas (e.g., benzene, toluene, xylene, naphthalene, and anthracene) and the like.

The average particle size of the primary particles of the raw material carbon black used when implementing the method for producing carbon black according to one embodiment of the invention is 15 to 35 nm, preferably 17 to 35 nm, more preferably 17 to 32 nm, further more preferably 17 to 30 nm, even more preferably 20 to 32 nm, still more preferably 20 to 30 nm, and yet more preferably 20 to 25 nm.

The Stokes mode diameter of the aggregates of the raw material carbon black used when implementing the method for producing carbon black according to one embodiment of the invention measured using a centrifugal sedimentation method is 50 to 115 nm, preferably 55 to 115 nm, more preferably 55 to 95 nm, further more preferably 60 to 95 nm, and still more preferably 60 to 90 n.

A commercially-available product having a particle size within the above range may be appropriately selected as the raw material carbon black used when implementing the method for producing carbon black according to one embodiment of the invention, for example. It is preferable to appropriately select high-structure hard carbon black (e.g., FEF (N550) or ISAF (N220)) having a small primary particle size, a large surface area, and a particle size within the above range as the raw material carbon black.

When the average particle size of the primary particles and the Stokes mode diameter of the aggregates of the raw material carbon black used when implementing the method for producing carbon black according to one embodiment of the invention are within the above ranges, it is possible to produce carbon black so that the average particle size of the primary particles and the Stokes mode diameter of the aggregates fall within the above ranges.

Note that the term "average particle size" used herein in connection with the primary particles of the raw material carbon black refers to the average value of the particle sizes of one thousand primary particles measured using a transmission electron microscope.

The term "Stokes mode diameter" used herein in connection with the aggregates of the raw material carbon black refers to a value measured as described above in connection with the Stokes mode diameter of the aggregates having a spherical shape using a centrifugal sedimentation method utilizing a centrifugal sedimentation particle size distribution analyzer (disk centrifuge manufactured by Joyes Lobel (UK)).

Examples of the fluidized-bed reactor used when implementing the method for producing carbon black according to one embodiment of the invention include a fluidized-bed reactor illustrated in FIG. 1.

A fluidized-bed reactor 1 illustrated in FIG. 1 has an approximately cylindrical shape, and the reactor axis extends in the vertical direction.

The fluidized-bed reactor 1 illustrated in FIG. 1 has a gas inlet 21 which is provided in the lower part of a reactor main body 2 and through which the hydrocarbon gas is fed upward, and an outlet 22 that is provided in the upper part of the reactor main body 2. As illustrated in FIG. 1, the fluidized-bed reactor 1 has a heater coil 3 that is formed by helically winding a heating wire around the entire outer wall of the reactor main body 2 so that a stirring zone 4 provided inside the reactor main body 2 can be heated.

When implementing the method for producing carbon black according to one embodiment of the invention, the hydrocarbon gas is fed to the fluidized-bed reactor to produce a gas stream.

The hydrocarbon gas is preferably fed to the fluidized-bed reactor in a pre-heated state. In this case, the pre-heating temperature is preferably 400 to 600° C., more preferably 450 to 600° C., further more preferably 450 to 550° C., even more preferably 480 to 550° C., and still more preferably 480 to 520° C.

The hydrocarbon gas is preferably fed to the fluidized-bed reactor at 4.0 to 6.0 $Nm^3/h$, more preferably 4.5 to 6.0 $Nm^3/h$, further more preferably 4.5 to 5.5 $Nm^3/h$, even more preferably 5.0 to 5.5 $Nm^3/h$, and still more preferably 5.0 to 5.3 $Nm^3/h$.

The hydrocarbon gas is preferably fed to the fluidized-bed reactor so that the gas inlet pressure is 1.0 to 2.0 MPa, more preferably 1.1 to 2.0 MPa, further more preferably 1.1 to 1.8 MPa, even more preferably 1.2 to 1.8 MPa, and still more preferably 1.2 to 1.5 MPa.

When implementing the method for producing carbon black according to one embodiment of the invention using the fluidized-bed reactor illustrated in FIG. 1, the hydrocarbon gas is fed through the gas inlet 21.

When implementing the method for producing carbon black according to one embodiment of the invention, the hydrocarbon gas may be fed in a state in which the raw material carbon black has been introduced into the reactor, or the raw material carbon black may be introduced through an inlet that is separately provided to the reactor after feeding the hydrocarbon gas to the reactor.

A commercially-available product (e.g., FEF (N550) or HAF (N330)) may be appropriately used as the raw material carbon black.

When implementing the method for producing carbon black according to one embodiment of the invention, the raw material carbon black introduced into the reactor is stirred and fluidized with heating due to the gas stream of the hydrocarbon gas.

The heating temperature is preferably 500 to 750° C., more preferably 550 to 750° C., further more preferably 550 to 720° C., even more preferably 600 to 720° C., and still more preferably 600 to 700° C.

The stirring-fluidizing time is preferably 100 to 300 seconds, more preferably 110 to 300 seconds, further more preferably 110 to 280 seconds, even more preferably 120 to 280 seconds, and still more preferably 120 to 250 seconds.

When implementing the method for producing carbon black according to one embodiment of the invention using the fluidized-bed reactor illustrated in FIG. 1, the raw material carbon black is stirred and mixed in the stirring zone 4 that is heated using the heater coil 2 after feeding the hydrocarbon gas through the gas inlet 21.

When the hydrocarbon gas is fed to the reactor with heating and the raw material carbon black is stirred and fluidized due to the gas stream of the hydrocarbon gas (i.e., the hydrocarbon gas comes in contact with the raw material carbon black), the hydrocarbon gas that has undergone pyrolysis is deposited on the surface of the aggregates of the raw material carbon black, and the fusion and the aggregation of the aggregates are promoted by stirring due to the gas stream of the hydrocarbon gas. It is considered that carbon black that forms large aggregates can thus be obtained while maintaining the primary particle size of the carbon black.

When implementing the method for producing carbon black according to one embodiment of the invention using the fluidized-bed reactor 1 illustrated in FIG. 1, the hydrocarbon gas is fed through the gas inlet 21 provided at the bottom of the reactor 1 while heating the reactor 1 using the heater coil 3, and the raw material carbon black is stirred and fluidized in the stirring zone 4 due to the gas stream of the hydrocarbon gas (i.e., the hydrocarbon gas comes in contact with the raw material carbon black). In this case, the hydrocarbon gas that has undergone pyrolysis is deposited on the surface of the aggregates of the raw material carbon black in the stirring zone 4, and the fusion and the aggregation of the aggregates are promoted by stirring due to the gas stream of the hydrocarbon gas. It is considered that the desired carbon black can thus be obtained.

After stirring the raw material carbon black using the hydrocarbon gas, the feeding of the hydrocarbon gas is stopped, and the resulting carbon black is allowed to cool preferably while introducing nitrogen gas to terminate the reaction.

The nitrogen gas is preferably fed to the fluidized-bed reactor at 4.0 to 6.0 $Nm^3/h$, more preferably 4.5 to 6.0 $Nm^3/h$, further more preferably 4.5 to 5.5 $Nm^3/h$, even more preferably 5.0 to 5.5 $Nm^3/h$, and still more preferably 5.0 to 5.3 $Nm^3$ h.

The carbon black particles (that have been allowed to cool) are separated and collected using a separation-collection unit (e.g., cyclone or bag filter) to collect the desired carbon black.

The details of the carbon black produced using the method for producing carbon black according to one embodiment of the invention are the same as described above in connection with the carbon black according to one embodiment of the invention.

The method for producing carbon black according to one embodiment of the invention can easily produce carbon black that ensures that a rubber obtained using a rubber composition that includes the carbon black is highly reinforced, and exhibits low heat buildup and improved impact resilience.

A rubber composition according to one embodiment of the invention is described below.

The rubber composition according to one embodiment of the invention includes 100 parts by mass of a rubber component, and 20 to 100 parts by mass of the carbon black according to one embodiment of the invention or carbon black obtained using the method for producing carbon black according to one embodiment of the invention.

The rubber component included in the rubber composition according to one embodiment of the invention may be at least one rubber component selected from natural rubber and a diene-based rubber such as a styrene-butadiene rubber, a polybutadiene rubber, an isoprene rubber, a butyl rubber, a chloroprene rubber, and an acrylonitrile-butadiene copolymer rubber, for example.

The rubber composition according to one embodiment of the invention includes the carbon black according to one embodiment of the invention or carbon black obtained using the method for producing carbon black according to one embodiment of the invention. The details of the carbon black included in the rubber composition are the same as described above.

The rubber composition according to one embodiment of the invention includes the carbon black according to one embodiment of the invention or carbon black obtained using the method for producing carbon black according to one embodiment of the invention. It is considered that the carbon black according to one embodiment of the invention or carbon black obtained using the method for producing carbon black according to one embodiment of the invention provides the rubber composition with excellent processability by advantageously reducing the viscosity of the rubber composition since the aggregates of the carbon black have an increased Stokes mode diameter and have a spherical structure.

It is considered that the carbon black according to one embodiment of the invention or carbon black obtained using the method for producing carbon black according to one embodiment of the invention (that forms aggregates having a spherical shape and having a large Stokes mode diameter) ensures that the rubber composition exhibits low heat buildup since the average particle size of the primary particles is within the desired range, and ensures that the rubber composition is sufficiently reinforced and exhibits low heat buildup since the Stokes mode diameter of the spherical aggregates of the carbon black is within the desired range.

The rubber composition according to one embodiment of the invention includes the carbon black according to one embodiment of the invention or carbon black obtained using the method for producing carbon black according to one embodiment of the invention in a ratio of 20 to 100 parts by mass, preferably 30 to 100 parts by mass, more preferably 30 to 90 parts by mass, further more preferably 40 to 90 parts by mass, and still more preferably 40 to 80 parts by mass, based on 100 parts by mass of the rubber component.

When the rubber composition according to one embodiment of the invention includes the carbon black according to one embodiment of the invention or carbon black obtained using the method for producing carbon black according to one embodiment of the invention in a ratio of 20 to 100 parts by mass based on 100 parts by mass of the rubber component, it is possible to obtain a rubber that exhibits excellent processability, is highly reinforced, and exhibits low heat buildup, excellent impact resilience, and the like.

The rubber composition according to one embodiment of the invention may include an inorganic reinforcing material in addition to the rubber component and the carbon black.

The inorganic reinforcing material may be one or more inorganic reinforcing materials selected from dry silica, wet silica (hydrated silicic acid or precipitated silica), aluminum hydroxide, calcium carbonate, clay, magnesium hydroxide, talc, mica, a composite thereof with carbon black, and the like.

The inorganic reinforcing material is preferably used in a ratio of 20 to 150 parts by mass, more preferably 30 to 150 parts by mass, further more preferably 30 to 100 parts by mass, even more preferably 40 to 100 parts by mass, and still more preferably 40 to 80 parts by mass, based on 100 parts by mass of the rubber component.

When the rubber composition according to one embodiment of the invention includes the inorganic reinforcing material in a ratio of 20 to 150 parts by mass based on 100 parts by mass of the rubber component, it is possible to improve the production efficiency by suppressing an increase in viscosity when producing the rubber composition, and efficiently reinforce the resulting rubber while efficiently reducing the heat buildup of the rubber.

When the rubber composition according to one embodiment of the invention includes silica as the inorganic reinforcing material, the rubber composition may further include a silane coupling agent. The silane coupling agent is preferably used in a ratio of 3 to 20 parts by mass based on 100 parts by mass of the inorganic reinforcing material. When the silane coupling agent is used in a ratio within the above range, it is possible to improve the dispersibility of the inorganic reinforcing material in the rubber composition, and sufficiently improve the reinforcement capability of the inorganic reinforcing material.

The rubber composition according to one embodiment of the invention may include a commonly-used optional component such as a vulcanizing agent, a vulcanization accelerator, an aging preventive, a vulcanization aid, a softener, and a plasticizer.

The rubber composition according to one embodiment of the invention may be obtained by kneading the rubber component, the desired amount of the carbon black, and the desired amount of an optional component (e.g., inorganic reinforcing material, silane coupling agent, vulcanizing agent, vulcanization accelerator, aging preventive, vulcanization aid, softener, and plasticizer). The components may be kneaded using a known kneader (e.g., mixer or mill).

The rubber composition according to one embodiment of the invention may be appropriately cured by heating the rubber composition at 130 to 180° C. to obtain the desired rubber.

Since the rubber composition according to one embodiment of the invention can produce a rubber that is highly reinforced and exhibits low heat buildup, improved impact resilience, and the like, and improve the degree of reinforcement and heat buildup in a well-balanced manner, the rubber composition according to one embodiment of the invention is suitable as a tire tread rubber composition.

EXAMPLES

The invention is further described below by way of examples. Note that the following examples are for illustration purposes only, and the invention is not limited to the following examples.

Example 1

Production of Carbon Black 1

Carbon black was produced using a fluidized-bed reactor 1 (that was configured in the same manner as illustrated in FIG. 1 and had an approximately cylindrical shape (in which the reactor axis extended in the vertical direction)).

The housing and the inner wall of the fluidized-bed reactor 1 (see FIG. 1) were formed of SUS304 and mullite, respectively. A reactor main body 2 of the fluidized-bed reactor 1 had a gas inlet 21 (inner diameter: 50 mm) (through which a hydrocarbon gas is fed upward), and an outlet 22 (inner diameter: 30 mm) that was provided in the upper part of the reactor main body 2. The fluidized-bed reactor 1 had a heater coil 3 formed by helically winding a heating wire around the entire outer wall of the reactor main body 2 so as to heat a stirring zone 4 (inner diameter: 100 mm, height: 200 mm) provided inside the reactor main body 2 (see FIG. 1).

A SUS filter 5 (mesh size: 0.2 mm) was provided between the reactor main body 2 and the gas inlet 21.

100 g of raw material carbon black 1 (average particle size of primary particles: 24 nm, Stokes mode diameter of aggregates measured using centrifugal sedimentation method 67 nm, DBP absorption: 45 ml/100 g, specific surface area by nitrogen adsorption: 80 $m^2/g$) was introduced into the stirring zone 4 of the fluidized-bed reactor 1, and the stirring zone 4 was heated to 700° C. using the heater coil 3. A hydrocarbon gas (town gas 13A, specific gravity: 0.638, $CH_4$: 89.6%, calorific value: 45 $MJ/m^3$) that was pre-heated to 500° C. was fed at 5 $Nm^3/h$ through the gas inlet 21 (gas inlet pressure: 1.3 MPa) to stir and fluidize the raw material carbon black 1 for 2 minutes. The heating operation using the heater coil 3 was then stopped, and the resulting carbon black was cooled at room temperature to obtain the target carbon black 1.

Table 1 shows the average particle size of the primary particles of the carbon black 1, the Stokes mode diameter of the aggregates of the carbon black 1 measured using a centrifugal sedimentation method, as well as the DBP absorption and the specific surface area by nitrogen adsorption of the carbon black 1.

FIG. 2 shows an electron micrograph of the aggregate of the carbon black 1 observed using a transmission electron microscope ("JEM-2000FX" manufactured by JEOL Ltd.). FIG. 3 shows an electron micrograph of the aggregate of the raw material carbon black 1 used in Example 1.

As is clear from a comparison between FIG. 2 and FIG. 3, an aggregate having a spherical shape (FIG. 2) was produced by the aggregation and the fusion of the aggregates of the raw material carbon black 1 having a dendritic shape (FIG. 3).

Example 2

Production of Carbon Black 2

Carbon black 2 was produced in the same manner as in Example 1, except that the raw material carbon black was stirred and fluidized using the hydrocarbon gas for 4 minutes instead of 2 minutes.

The resulting carbon black 2 was observed using a transmission electron microscope ("JEM-2000FX" manufactured by JEOL Ltd.). It was found that the aggregates of the raw material carbon black 1 further aggregated and fused to form aggregates having a spherical shape.

Table 1 shows the average particle size of the primary particles of the carbon black 2, the Stokes mode diameter of the aggregates of the carbon black 2 measured using a centrifugal sedimentation method, as well as the DBP absorption and the specific surface area by nitrogen adsorption of the carbon black 2.

Comparative Example 1

Raw material carbon black 2 (average particle size of primary particles: 24 nm, Stokes mode diameter of aggregates measured using centrifugal sedimentation method 67 nm, DBP absorption: 45 ml/100 g, specific surface area by nitrogen adsorption: 90 $m^2/g$) was used directly as comparative carbon black 1 without subjecting the raw material carbon black 2 to the reaction using the fluidized-bed reactor (see Example 1).

The comparative carbon black 1 was observed using a transmission electron microscope ("JEM-2000FX" manufactured by JEOL Ltd.). It was found that the aggregates of the comparative carbon black 1 had a dendritic shape.

Comparative Example 2

Raw material carbon black 3 (average particle size of primary particles: 39 nm. Stokes mode diameter of aggregates measured using centrifugal sedimentation method: 177 nm, DBP absorption: 168 ml/100 g. specific surface area by nitrogen adsorption: 52 $m^2/g$) was used directly as comparative carbon black 2 without subjecting the raw material carbon black 3 to the reaction using the fluidized-bed reactor (see Example 1).

The comparative carbon black 2 was observed using a transmission electron microscope ("JEM-2000FX" manufactured by JEOL Ltd.). It was found that the aggregates of the comparative carbon black 2 had a dendritic shape.

TABLE 1

| | | Example 1 | Example 2 | Comparative Example 1 | Comparative Example 2 |
|---|---|---|---|---|---|
| Production conditions | Stirring-fluidizing time (min) | 2 | 4 | 0 | 0 |
| Properties of carbon black | Average particle size (nm) of primary particles | 26 | 26 | 24 | 39 |
| | Stokes mode diameter (nm) of aggregates | 145 | 178 | 67 | 177 |
| | DBP absorption (ml/100 g) | 122 | 157 | 45 | 168 |
| | Specific surface area ($m^2/g$) by nitrogen adsorption | 80 | 82 | 90 | 52 |

Example 3

Production of Carbon Black 3

Carbon black 3 was produced in the same manner as in Example 1, except that raw material carbon black 4 (average particle size of primary particles: 24 nm, Stokes mode diameter of aggregates measured using centrifugal sedimentation method: 79 nm. DBP absorption: 82 ml/100 g, specific surface area by nitrogen adsorption: 90 $m^2/g$) was used instead of the raw material carbon black 1. Note that the aggregates of the raw material carbon black 4 had a dendritic shape when observed using a transmission electron microscope ("JEM-2000FX" manufactured by JEOL Ltd.).

The resulting carbon black 3 was observed using a transmission electron microscope ("JEM-2000FX" manufactured by JEOL Ltd.). It was found that the aggregates of the raw material carbon black 4 further aggregated and fused to form aggregates having a spherical shape.

Table 2 shows the average particle size of the primary particles of the carbon black 3, the Stokes mode diameter of the aggregates of the carbon black 3 measured using a centrifugal sedimentation method, as well as the DBP absorption and the specific surface area by nitrogen adsorption of the carbon black 3.

Comparative Example 3

Raw material carbon black 5 (average particle size of primary particles: 38 nm, Stokes mode diameter of aggregates measured using centrifigal sedimentation method: 117 nm, DBP absorption: 65 ml/100 g, specific surface area by nitrogen adsorption: 50 $m^2/g$) was used directly as comparative carbon black 3 without subjecting the raw material carbon black 5 to the reaction using the fluidized-bed reactor (see Example 1).

The comparative carbon black 3 was observed using a transmission electron microscope ("JEM-2000FX" manufactured by JEOL Ltd.). It was found that the aggregates of the comparative carbon black 3 had a dendritic shape.

Comparative Example 4

Raw material carbon black 6 (average particle size of primary particles: 39 nm, Stokes mode diameter of aggregates measured using centrifugal sedimentation method: 189 nm, DBP absorption: 160 ml/100 g. specific surface area by nitrogen adsorption: 52 $m^2/g$) was used directly as comparative carbon black 4 without subjecting the raw material carbon black 6 to the reaction using the fluidized-bed reactor (see Example 1).

The comparative carbon black 4 was observed using a transmission electron microscope ("JEM-2000FX" manufactured by JEOL Ltd.). It was found that the aggregates of the comparative carbon black 4 had a dendritic shape.

TABLE 2

|  |  | Example 3 | Comparative Example 3 | Comparative Example 4 |
|---|---|---|---|---|
| Production conditions | Stirring-fluidizing time (min) | 4 | 0 | 0 |
| Properties of carbon black | Average particle size (nm) of primary particles | 24 | 38 | 39 |
|  | Stokes mode diameter (nm) of aggregates | 152 | 117 | 189 |
|  | DBP absorption (ml/100 g) | 138 | 65 | 160 |
|  | Specific surface area ($m^2/g$) by nitrogen adsorption | 90 | 50 | 52 |

Example 4

Production of Carbon Black 4

Carbon black 4 was produced in the same manner as in Example 1, except that raw material carbon black 7 (average particle size of primary particles: 21 nm, Stokes mode diameter of aggregates measured using centrifugal sedimentation method: 115 nm, DBP absorption: 123 ml/100 g, specific surface area by nitrogen adsorption: 113 $m^2/g$) was used instead of the raw material carbon black 1. Note that the aggregates of the raw material carbon black 7 had a dendritic shape when observed using a transmission electron microscope ("JEM-2000FX" manufactured by JEOL Ltd.).

The resulting carbon black 4 was observed using a transmission electron microscope ("JEM-2000FX" manufactured by JEOL Ltd.). It was found that the aggregates of the raw material carbon black 7 further aggregated and fused to form aggregates having a spherical shape.

Table 3 shows the average particle size of the primary particles of the carbon black 4, the Stokes mode diameter of the aggregates of the carbon black 4 measured using a centrifugal sedimentation method, as well as the DBP absorption and the specific surface area by nitrogen adsorption of the carbon black 4.

Comparative Example 5

Raw material carbon black 8 (average particle size of primary particles: 58 nm, Stokes mode diameter of aggregates measured using centrifugal sedimentation method: 140 nm, DBP absorption: 95 ml/100 g, specific surface area by nitrogen adsorption: 40 $m^2/g$) was used directly as comparative carbon black 5 without subjecting the raw material carbon black 8 to the reaction using the fluidized-bed reactor (see Example 1).

The comparative carbon black 5 was observed using a transmission electron microscope ("JEM-2000FX" manufactured by JEOL Ltd.). It was found that the aggregates of the comparative carbon black 5 had a dendritic shape.

Comparative Example 6

Raw material carbon black 9 (average particle size of primary particles: 14 nm, Stokes mode diameter of aggregates measured using centrifugal sedimentation method: 160 nm, DBP absorption: 133 ml/100 g, specific surface area by nitrogen adsorption: 195 m$^2$/g) was used directly as comparative carbon black 6 without subjecting the raw material carbon black 9 to the reaction using the fluidized-bed reactor (see Example 1).

The comparative carbon black 6 was observed using a transmission electron microscope ("JEM-2000FX" manufactured by JEOL Ltd.). It was found that the aggregates of the comparative carbon black 6 had a dendritic shape.

at 100° C. for 5 minutes) of the rubber composition was measured using a Mooney viscometer ("AM-3" manufactured by Toyo Seiki Seisaku-sho, Ltd.). The measurement results are shown in Table 5.

The Mooney unit M is used for the Mooney viscosity (see Tables 5 to 7). A rubber having a small Mooney viscosity value exhibits high fluidity and high processability when molded.

TABLE 3

|  |  | Example 4 | Compartative Example 5 | Comparative Example 6 |
|---|---|---|---|---|
| Production conditions | Stirring-fluidizing time (min) | 4 | 0 | 0 |
| Properties of carbon black | Average particle size (nm) of primary particles | 21 | 58 | 14 |
|  | Stokes mode diameter (nm) of aggregates | 163 | 140 | 160 |
|  | DBP absorption (ml/100 g) | 130 | 95 | 133 |
|  | Specific surface area (m$^2$/g) by nitrogen adsorption | 113 | 40 | 195 |

As is clear from Tables 1 to 3, carbon black having high DBP absorption and forming spherical aggregates having a large Stokes mode diameter could be obtained while maintaining the primary particle size of the raw material carbon black by producing carbon black by stirring and fluidizing specific raw material carbon black using the hydrocarbon gas.

Example 5

Rubber Composition Production Example 70 parts by mass of the carbon black 1 obtained in Example 1, 80 parts by mass of styrene-butadiene rubber ("Nipol NS116R" manufactured by Zeon Corporation) (rubber component), 20 parts by mass of polybutadiene rubber ("JSR BR01" manufactured by JSR Corporation) (rubber component), 2 parts by mass of stearic acid, parts by mass of oil ("Tudalen 65" manufactured by Starry Oil Corporation), and 3 parts by mass of zinc oxide were kneaded for 4 minutes using an internal mixer ("MIXTRON BB-2" manufactured by Kobe Steel, Ltd.). After the addition of 2 parts by mass of a vulcanization accelerator ("Accel CZ" manufactured by Kawaguchi Chemical Industry Co., Ltd) and 2 parts by mass of sulfur, the mixture was kneaded using open rolls to obtain a rubber composition having the composition shown in Table 4.

TABLE 4

| Component | Parts by mass |
|---|---|
| Carbon black | 70 |
| Styrene-butadiene rubber | 80 |
| Polybutadiene rubber | 20 |
| Oil | 30 |
| Stearic acid | 2 |
| Zinc oxide | 3 |
| Vulcanization accelerator | 2 |
| Sulfur | 2 |

Mooney Viscosity (M)

The Mooney viscosity (i.e., the viscosity of the rubber composition when the rubber composition has been heated The rubber composition was vulcanized at 160° C. for 20 minutes using a mold having dimensions of 15×15×0.2 cm to obtain a vulcanized rubber.

The loss factor (tan δ) and the tensile strength of the resulting vulcanized rubber were measured using the following methods. The measurement results are shown in Table 5.

Loss Factor (Tan δ)

A specimen (see below) was cut from the vulcanized rubber, and the loss factor (tan δ) of the specimen was measured under the following conditions using a viscoelastic spectrometer ("VR-7110" manufactured by Ueshima Seisakusho Co., Ltd.). Note that a small loss factor (tan) (at 60° C.) indicates that the heat buildup is low.

Size of specimen: thickness: 2 mm, length: 35 mm, width: 5 mm

Frequency: 50 Hz

Dynamic strain rate: 1.2%

Measurement temperature: 60° C.

Tensile Stress

The tensile stress (MPa) of a JLS No. 3 specimen was measured using a tensile tester ("Strograph AR" manufactured by Toyo Seiki Seisaku-sho, Ltd.) (tensile rate: 500±25 mm/min).

Example 6

Rubber Composition Production Example

A rubber composition was produced in the same manner as in Example 5, except that the carbon black obtained in Example 2 was used instead of the carbon black 1 obtained in Example 1. The Mooney viscosity of the rubber composition was measured in the same manner as in Example 5. The rubber composition was vulcanized in the same manner as in Example 5 to obtain a vulcanized rubber, and the loss factor (tan δ) and the tensile strength (300% strain) of the resulting vulcanized rubber were measured in the same manner as in Example 5. The measurement results are shown in Table 5.

Comparative Examples 7 and 8

Rubber Composition Production Example

A rubber composition was produced in the same manner as in Example 5, except that the comparative carbon black 1 obtained in Comparative Example 1 was used instead of the carbon black 1 obtained in Example 1 (Comparative Example 7), or the comparative carbon black 2 obtained in Comparative Example 2 was used instead of the carbon black 1 obtained in Example 1 (Comparative Example 8). The Mooney viscosity of the rubber composition was measured in the same manner as in Example 5. The rubber composition was vulcanized in the same manner as in Example 5 to obtain a vulcanized rubber, and the loss factor (tan δ) and the tensile stress (300% strain) of the resulting vulcanized rubber were measured in the same manner as in Example 5. The measurement results are shown in Table 5.

Note that Table 5 shows the ratio (%) relative to the value (=100%) obtained in Example 5, and shows the measured value in parentheses. The Mooney viscosity, the tensile strength (300% strain), or the loss factor (tan δ) was considered to be improved when the value shown in Table 5 was improved by 5% or more relative to the value obtained in Example 5.

TABLE 5

|  | Comparative Example 7 | Comparative Example 8 | Example 5 | Example 6 |
|---|---|---|---|---|
| Carbon black | Comparative carbon black 1 | Comparative carbon black 2 | Carbon black 1 | Carbon black 2 |
| Mooney viscosity | 137% (58.1M) | 124% (52.4M) | 100% (42.4M) | 83% (35.4M) |
| Tensile strength | 65% (7.9 MPa) | 83% (10.1 MPa) | 100% (12.1 MPa) | 121% (14.6 MPa) |
| Loss factor (tanδ) | 124% (0.267) | 110% (0.262) | 100% (0.238) | 88% (0.210) |

Example 7 and Comparative Examples 9 and 10

Rubber Composition Production Example

A rubber composition was produced in the same manner as in Example 5, except that the carbon black 3 obtained in Example 3 was used as the carbon black (Example 7), or the comparative carbon black 3 obtained in Comparative Example 3 was used as the carbon black (Comparative Example 9), or the comparative carbon black 4 obtained in Comparative Example 4 was used as the carbon black (Comparative Example 10). The Mooney viscosity of the rubber composition was measured in the same manner as in Example 5. The rubber composition was vulcanized in the same manner as in Example 5 to obtain a vulcanized rubber, and the loss factor (tan δ) and the tensile stress (300% strain) of the resulting vulcanized rubber were measured in the same manner as in Example 5. The measurement results are shown in Table 6.

Note that Table 6 shows the ratio (%) relative to the value (=100%) (Mooney viscosity, tensile strength (300% strain), and loss factor (tan δ)) obtained in Example 7, and shows the measured value in parentheses. The Mooney viscosity, the tensile strength (300% strain), or the loss factor (tan δ) was considered to be improved when the value shown in Table 6 was improved by 5% or more relative to the value obtained in Example 7.

TABLE 6

|  | Comparative Example 9 | Comparative Example 10 | Example 7 |
|---|---|---|---|
| Carbon black | Comparative carbon black 3 | Comparative carbon black 4 | Carbon black 3 |
| Mooney viscosity | 137% (57.3M) | 132% (55.1M) | 100% (41.8M) |
| Tensile strength | 91% (12.2 MPa) | 81% (10.8 MPa) | 100% (13.4 MPa) |
| Loss factor (tanδ) | 120% (0.306) | 114% (0.289) | 100% (0.254) |

Example 8 and Comparative Examples 11 and 12

Rubber Composition Production Example

A rubber composition was produced in the same manner as in Example 5, except that the carbon black 4 obtained in Example 4 was used as the carbon black (Example 8), or the comparative carbon black 5 obtained in Comparative Example 5 was used as the carbon black, or the comparative carbon black 6 obtained in Comparative Example 6 was used as the carbon black. The Mooney viscosity of the rubber composition was measured in the same manner as in Example 5. The rubber composition was vulcanized in the same manner as in Example 5 to obtain a vulcanized rubber, and the loss factor (tan δ) and the tensile strength (300% strain) of the resulting vulcanized rubber were measured in the same manner as in Example 5. The measurement results are shown in Table 7.

Note that Table 7 shows the ratio (%) relative to the value (=100%) (Mooney viscosity, tensile strength (300% strain), and loss factor (tan δ)) obtained in Example 8, and shows the measured value in parentheses. The Mooney viscosity, the tensile strength (300% strain), or the loss factor (tan δ) was considered to be improved when the value shown in Table 7 was improved by 5% or more relative to the value obtained in Example 8.

TABLE 7

|  | Comparative Example 11 | Comparative Example 12 | Example 8 |
|---|---|---|---|
| Carbon black | Comparative carbon black 5 | Comparative carbon black 6 | Carbon black 4 |
| Mooney viscosity | 115% (56.2M) | 115% (52.4M) | 100% (45.7M) |
| Tensile strength | 84% (10.3 MPa) | 93% (11.5 MPa) | 100% (12.3 MPa) |
| Loss factor (tanδ) | 115% (0.166) | 129% (0.186) | 100% (0.144) |

As shown in Table 5, the rubber compositions obtained in Examples 5 and 6 had a low Mooney viscosity (i.e., exhibited improved processability), and produced a rubber having an improved loss factor (tan δ) and high tensile strength as compared with the rubber compositions obtained in Comparative Examples 7 and 8. As shown in Table 6, the rubber composition obtained in Example 7 had a low Mooney viscosity (i.e., exhibited improved processability), and produced a rubber having an improved loss factor (tan δ) and high tensile strength as compared with the rubber compositions obtained in Comparative Examples 9 and 10. As shown in Table 7, the rubber composition obtained in Example 8 had a low Mooney viscosity (i.e., exhibited improved processability), and produced a rubber having an improved loss factor (tan δ) and high tensile strength as compared with the rubber compositions obtained in Comparative Examples 11 and 12. It was thus confirmed that the rubber compositions obtained in Examples 5 to 8 exhibited excellent processability, were highly reinforced, and exhibited low heat buildup.

INDUSTRIAL APPLICABILITY

The embodiments of the invention can thus provide carbon black that ensures that a rubber obtained using a rubber composition that includes the carbon black exhibits improved processability, is reinforced in an improved manner, and exhibits low heat buildup.

The embodiments of the invention can thus provide a method that can easily produce the carbon black.

The embodiments of the invention can thus provide a rubber composition that improves rubber properties (e.g., degree of reinforcement, heat buildup, and processability).

REFERENCE SIGNS LIST

1 Fluidized-bed reactor
2 Reactor main body
21 Gas inlet
22 Outlet
3 Heater coil
4 Stirring zone
5 Filter

The invention claimed is:

1. Carbon black, comprising:
   primary particles having an average particle size of 15 to 35 nm, the carbon black forming aggregates having a Stokes mode diameter measured using a centrifugal sedimentation method of 140 to 180 nm, and having a spherical shape when observed using a transmission electron microscope,
   wherein the carbon black has a DBP absorption of 120 to 160 ml/100 g and a specific surface area by nitrogen adsorption of 70 to 120 $m^2/g$.

2. A method for producing the carbon black according to claim 1 using a fluidized-bed reactor, the method comprising:
   feeding a hydrocarbon gas to the fluidized-bed reactor to produce a gas stream, and
   stirring and fluidizing raw material carbon black using the gas stream with heating, the raw material carbon black being introduced into the fluidized-bed reactor separately from the hydrocarbon gas, and comprising primary particles having an average particle size of 15 to 35 nm, the raw material carbon black forming aggregates having a Stokes mode diameter measured using a centrifugal sedimentation method of 50 to 115 nm.

3. A rubber composition comprising 100 parts by mass of a rubber component, and 20 to 100 parts by mass of the carbon black according to claim 1.

4. A rubber composition comprising 100 parts by mass of a rubber component, and 20 to 100 parts by mass of the carbon black obtained using the method according to claim 2.

* * * * *